United States Patent [19]

Bessho

[11] 3,919,787

[45] Nov. 18, 1975

[54] AUTOMATIC LIGHT CONTROL SYSTEM FOR DEMONSTRATING SUNRISE AND SUNSET SCENES IN PLANETARIUM

[75] Inventor: Takeshi Bessho, Hisai, Japan

[73] Assignee: Minolta Camera Kabushiki Kaisha, Osaka, Japan

[22] Filed: Nov. 29, 1974

[21] Appl. No.: 528,183

[30] Foreign Application Priority Data

Dec. 25, 1973 Japan .......................... 48-49352[U]

[52] U.S. Cl. .............................................. 35/42.5
[51] Int. Cl.² ......................................... G09B 27/00
[58] Field of Search ..................................... 35/42.5

[56] References Cited
UNITED STATES PATENTS

| | | | |
|---|---|---|---|
| 2,827,827 | 3/1958 | Spitz | 35/42.5 |
| 2,827,828 | 3/1958 | Vaux et al. | 35/42.5 |
| 3,074,183 | 1/1963 | Frank | 35/42.5 |
| 3,552,037 | 1/1971 | Stern | 35/42.5 |
| 3,571,954 | 3/1971 | Frank | 35/42.5 |
| 3,574,955 | 4/1971 | Skolnick | 35/42.5 |
| 3,707,786 | 1/1973 | Clark | 35/42.5 |

*Primary Examiner*—Wm. H. Grieb
*Attorney, Agent, or Firm*—Wolder & Gross

[57] ABSTRACT

System comprising daylight lamps for the basic illumination of a dome, an automatic light control circuit therefor, a proportion lamp variable in the amount of light in proportion to a change in the brightness of the daylight lamps, an inverse proportion lamp variable in the amount of light in inverse proportion to the same, light control means for controlling the brightnesses of lamps for dawn, twilight, sunrise glow and sunset glow and like lamps of the proportion type with controlled timing upon detecting the amount of light of the proportion lamp, and another light control means for controlling the brightnesses of light source lamps for projecting fixed stars and planets and like lamps of the inverse proportion type with controlled timing upon detecting the amount of light of the inverse proportion lamp. Light control for the lamps is automatically effected for the demonstration of sunrise and sunset scenes by the planetarium apparatus.

7 Claims, 8 Drawing Figures

AUTOMATIC LIGHT CONTROL SYSTEM FOR DEMONSTRATING SUNRISE AND SUNSET SCENES IN PLANETARIUM

BACKGROUND OF THE INVENTION

The present invention relates to an automatic light control system for the sunrise and sunset scenes to be represented by a planetarium, more particularly to an automatic light control system for automatically demonstrating sunrise and sunset scenes.

Conventionally for the demonstration of sunrise and sunset scenes, the knobs of the required light control devices are manually operated by an experienced operator to vary the brightnesses of daylight lamp, lamps for sunrise glow, sunset glow, dawn, twilight and lamps for projecting fixed stars and planets with the desired timing. Such operation must be performed within a relatively short period of time while operating the planetarium apparatus for other motions and therefore requires much skill and labor.

The operator usually follows the procedures given below for the operation of instruments to represent sunrise and sunset scenes.

Operation for sunset scene:
1. The diurnal motion mechanism is operated to set the projected image of the sun at the desired position on the west side of dome. (This position is almost predetermined.)
2. The brightness of daylight lamp is set at a suitable value along with the above procedure (1).
3. The brightneses of lamps for sunset glow and twilight on the west side are suitably adjusted.
4. Diurnal motion is initiated to progressively lower the projected image of the sun toward the horizon.
5. The daylight lamp is dimmed gradually.
6. The daylight lamp is so adjusted that is has become slightly dark by the time the image of the sun approaches the horizon.
7. The light source lamps for fixed star and planet projectors are made slightly brighter along with the procedure (6).
8. The sunset glow lamp is dimmed gradually along with the procedure (6).
9. The twilight lamp is gradually dimmed when the sunset glow lamp becomes dark.
10. The light sources for the fixed star and planet projectors are made brightest.
11. Diurnal motion is allowed to proceed or stopped.

In addition to the above procedures, light control operation is performed for the sun and moon.

The procedures stated above for a sunset scene are followed in the reverse order for the demonstration of sunrise scene. However, whereas the daylight lamp is rendered more or less dark for the sunset scene when the projected image of the sun is still positioned above the horizon in the course of diurnal motion, the daylight lamp when representing the sunrise scene is slightly brightened immediately before the image of the sun appears from the horizon.

Thus the conventional planetarium apparatus requires very troublesome procedures and great skill when representing sunrise and sunset scenes.

SUMMARY OF THE INVENTION

An object of this invention is to automatically control the brightnesses of light sources for projectors and illumination lamps in a planetarium apparatus for the demonstration of sunrise and sunset scenes and to thereby greatly simplify the operation of the instrument at sunrise and sunset which is most troublesome in operating the planetarium apparatus.

Another object of this invention is to provide a system which is easy to incorporate into existing planetarium apparatus.

In a planetarium apparatus including daylight lamps for the basic illumination of a dome, a dawn lamp, a twilight lamp, a sunrise glow lamp, a sunset glow lamp and like lamps of the proportion type whose brightnesses are varied in proportion to the brightness of the daylight lamps for representing sunrise and sunset scenes, and light source lamps for fixed star projectors, for planet projectors and like lamps of the inverse proportion type whose brightnesses are varied in inverse proportion to the brightness of the daylight lamps, the present invention provides a system for fulfilling the foregoing objects which comprises light control means for automatically varying the brightness of the daylight lamps, a proportion lamp electrically connected to the light control means and variable in the amount of light in proportion to the brightness of the daylight lamps, an inverse proportion lamp electrically connected to the light control means and variable in the amount of light in inverse proportion to the brightness of the daylight lamps, another light control means including a sensor for converting the brightness of the proportion lamp to an electric signal upon detecting the amount of light thereof so as to control by the electric signal the timing with which the brightnesses of the lamps of the proportion type are varied in proportion to the brightness of the daylight lamps, and another light control means including a sensor for converting the brightness of the inverse proportion lamp to an electric signal upon detecting the amount of light thereof so as to vary by the electric signal the brightnesses of the lamps of the inverse proportion type in inverse proportion to the brightness of the daylight lamps and to control the timing for the variation.

The light control means for the daylight lamps comprises two selecting switches, i.e., an automatic/manual selecting switch and a morning/evening selecting switch for the demonstration of sunrise scene or sunset scene, a charge/discharge circuit including the combination of a capacitor and a resistor, and a control circuit including a unijunction transistor and a bidirectional SCR, such that the conduction angle of the SCR is varied to automatically vary the brightness of the daylight lamps.

The proportion lamp and the inverse proportion lamp are electrically connected to the light control means for the daylight lamps, in series and in parallel therewith respectively, so as to give the desired changes in the brightness, i.e. in the amount of light thereof.

The light control means for the lamps of the proportion type comprises a morning/evening selecting switch for selectively representing a sunrise scene or sunset scene, a plurality of relays operatively related to the selecting switch, selecting contacts to be operated by the relays, a sensor such as CdS for detecting the amount of light of the proportion lamp and a charge/discharge circuit composed of the combination of a resistor and a capacitor. For the demonstration of sunrise scene, the sensor is short-circuited by one of the selecting contacts of the relays to progressively brighten the dawn lamp and/or the sunrise glow lamp in corresponding relation to the time constant of charge by the charge/discharge circuit. For the demonstration of sunset scene, the sensor controls the light control timing and gradually dims the twilight lamp and/or the sunset glow lamp in corresponding relation to the time constant of discharge by the charge/discharge circuit.

The light control circuit for the lamps of the inverse proportion type comprises a sensor for detecting the amount of light of the inverse proportion lamp, a bidirectional SCR for controlling current through the lamps of the inverse proportion type and a unijunction transistor for setting the timing to initiate that control, whereby the lamps of the inverse proportion type are brightened in corresponding relation to a decrease in the resistivity of the sensor.

Thus as will be described below, the present invention greatly simplifies the procedures for the demonstration of sunrise and sunset scenes, other than the operation concerned with the sun and moon, as compared with the conventional method.

The procedures for the demonstration of sunset scene will be exemplified below:
1. The projected image of the sun is brought into diurnal motion, the resulting changes in the position of the sun being in conformity with changes in the brightness of the daylight lamps.
2. The switch of circuit for automatically controlling light for sunrise and sunset is operated to close the circuit for sunset.
3. Sunset scene is automatically simulated.
4. When the projected image of the sun is brought to below the horizon, the diurnal motion is allowed to proceed or stopped.

These procedures are followed in the reverse order for the demonstration of sunrise scene.

In this way the light control of various lamps which is the most troublesome operation in the representation of sunrise and sunset scenes can be effected automatically. This makes it possible to demonstrate these scenes with great ease, without requiring skill and free of failure.

Use of the light control means employing the proportion lamp and inverse proportion lamp remarkably simplifies the construction of the present system, permitting the system to be incorporated into conventional planetarium apparatus without the necessity to make mechanical changes but simply by modifying electric wiring. Thus conventional planetarium apparatus can be improved with ease.

Other objects and features of this invention will becomes more apparent from the following description.

DESCRIPTION OF THE PREFERRED EMBODIMENT

Figure 1:
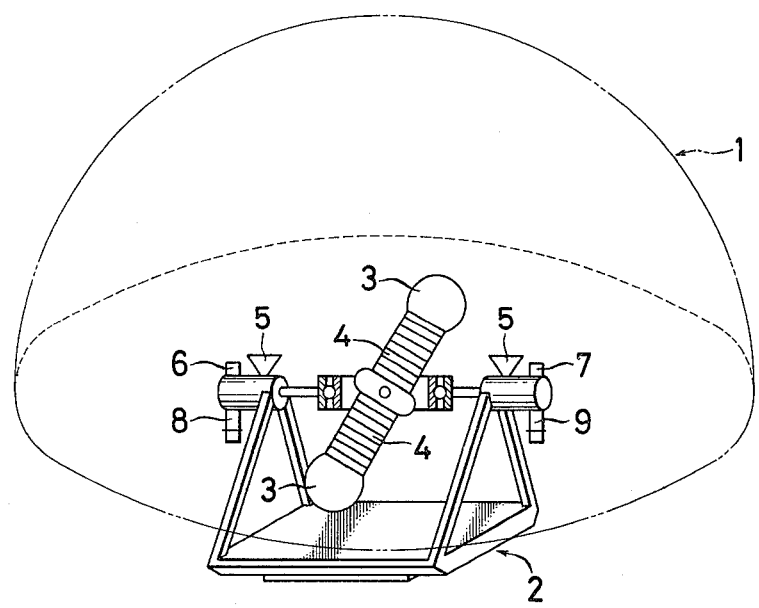
FIG. 1 is a perspective view showing a planetarium apparatus.

As shown in FIG. 1, a planetarium apparatus comprises a dome 1 on which the images of the sun, moon, planets, fixed stars and the like are projected and a projector 2 for projecting these images. The projector 2 includes fixed star projecting globes 3 having fixed star projectors, portions 4 having projectors for the sun, moon and planets, daylight lamps 5 for the basic illumination of the dome 1, a lamp 6 for dawn, a lamp 7 for twilight, a lamp 8 for sunrise glow, a lamp 9 for sunset glow, etc.

Figure 2:
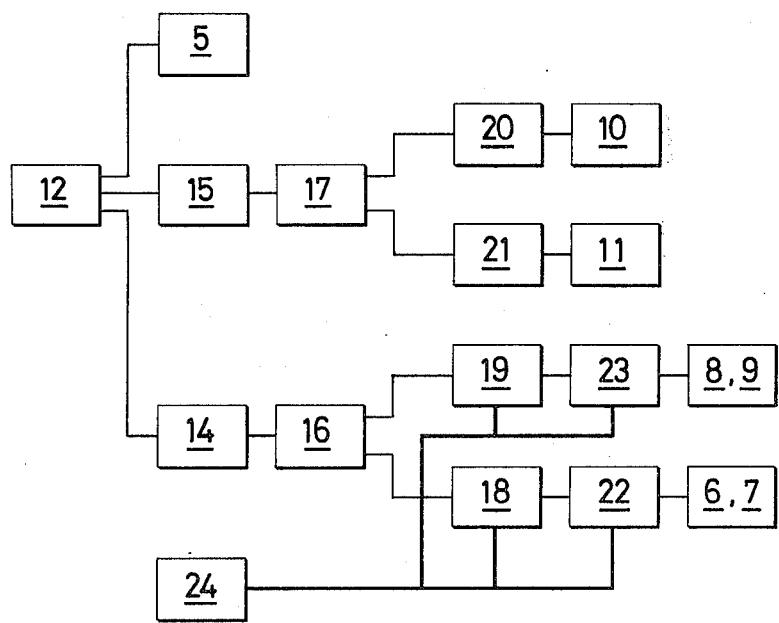
FIG. 2 is a block diagram showing the circuit of an embodiment of this invention.

FIG. 2 is a block diagram showing the circuit of automatic light control system of this invention for automatically controlling the brightnesses of light sources for the above-mentioned lamps and projectors. Light source lamps 10 for fixed star projectors and light source lamps 11 for planet projectors shown are each provided in a required number.

Figure 3A:
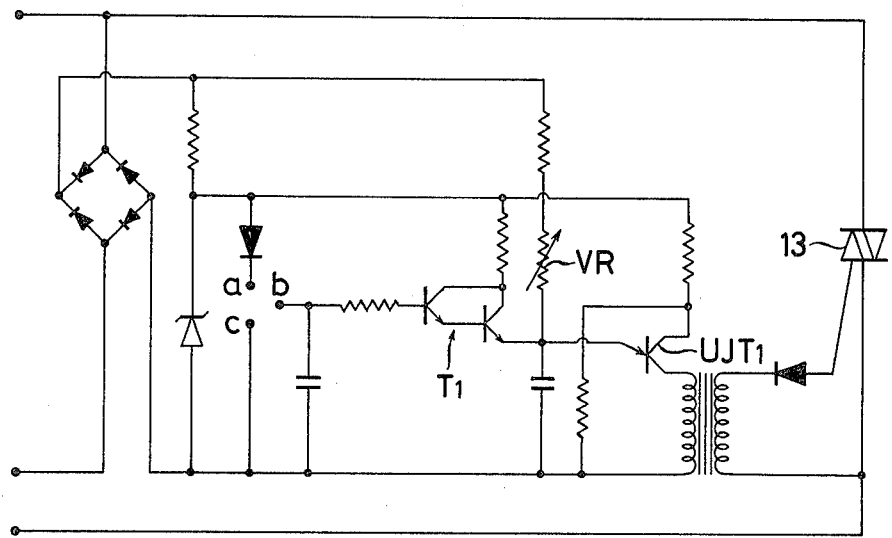
FIGS. 3A and 3B are diagrams showing a light control circuit for daylight lamps.
Figure 3B:
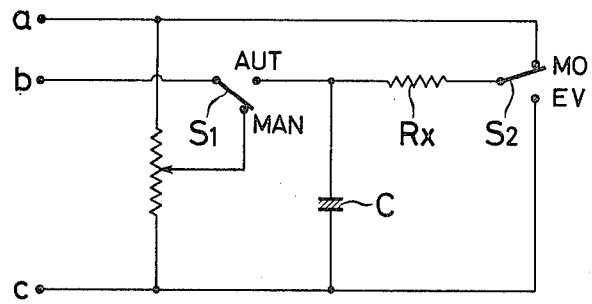

The daylight lamps 5 for the basic illumination of the dome 1 are provided with an automatic light control circuit 12 which, as shown in FIGS. 3A and 3B, includes a switch S1 for selectively energizing an automatic light control circuit or a manual light control circuit for automatic light control or manual light control and another switch S2 for selectively representing a sunrise scene or a sunset scene. The terminals a, b and c in FIG. 3A respectively, FIGS. 3A and 3B thus showing one light control circuit.

When the switch S1 is closed at an automatic contact AUT, with the switch S2 closed at a morning contact MO in FIG. 3B for the representation of sunrise scene, current flows from the terminal a through the switch S2 and a resistor RX to charge a capacitor C. When the potential at the terminal b increases, the base potential of a unijunction transistor UJT1 increases by way of a transistor circuit T1. This quickens the trigger timing of a bidirectional SCR 13, increasing its conduction angle to increase current supply to the daylight lamps 5. Consequently the brightness of the daylight lamps 5 increases.

If the switch S2 is closed at an evening contact EV for the demonstration of sunset scene, with the switch S1 closed at the automatic contact AUT, the capacitor C discharges through the resistor RX and switch S2 to lower the base potential of the unijunction transistor UJT1, thereby delaying the trigger timing of the SCR 13 and reducing its conduction angle. As a result, current supply to the daylight lamps 5 decreases and lowers the brightness of the lamps.

Thus through the operation of the switch S2, the brightness of the daylight lamps 5 can be controlled for sunrise and sunset scenes respectively, exactly in reverse manner to each other.

On the other hand when the switch S1 is closed at a manual contact MAN, the automatic light control circuit comprising the resistor RX and capacitor C is out of operation, so that the dimming control of the daylight lamps 5 can be performed by manually operating a variable resistor VR in FIG. 3A.

It will be apparent that the daylight lamps 5 which play a basic role in representing sunrise and sunset scenes are suitably operated for these scenes under the control of the automatic light control circuit 12 shown in FIG. 2. The system according to this invention further includes a proportion lamp 14 the amount of light of which varies in proportion to an increase or decrease in the brightness of the daylight lamps 5 and an inverse proportion lamp 15 which is variable in the amount of light in inverse proportion to the brightness of the daylight lamps 5. The sunrise glow lamp 8, sunset glow lamp 9, dawn lamp 6, twilight lamp 7, etc., of the proportion type whose brightnesses must be varied in proportion to the brightnesses of the daylight lamps 5 are subjected to automatic light control by a signal from CdS or like sensor 16 for detecting the amount of light of the proportion lamp 14. On the other hand, the brightnesses of light source lamps 10 for the fixed star projectors, light source lamps 11 for planet projectors and like lamps of the inverse proportion type which must be varied in inverse porportion to the brightnesses of the daylight lamps 5 are automatically controlled by a signal from CdS or like sensor 17 for detecting the amount of light of the inverse proportion lamp 15.

Figure 4:
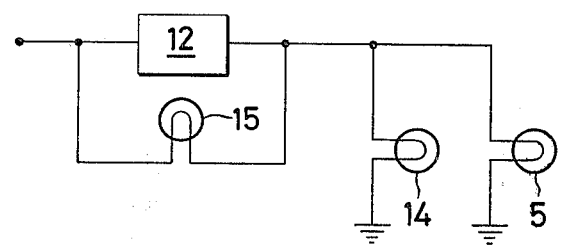
FIG. 4 is a diagram showing an example of circuit for connecting the light control circuit for the daylight lamps to a proportion lamp and to an inverse proportion lamp.

As shown in FIG. 4, the proportion lamp 14 is connected in series with the automatic control circuit 12, whilst the inverse proportion lamp 15 is connected in parallel with the circuit 12. Consequently, the lamps 14 and 15 are subjected to changes in current resulting from the control of the daylight lamp 5 by the automatic light control circuit 12, the lamps 14 and 15 thereby being controlled in reverse relation to each other so as to function reversely to each other as described above.

FIG. 2 further shows a dawn/twilight dimming control circuit 18 for the dawn lamp 6 and twilight lamp 7, a sunrise/sunset dimming control circuit 19 for the sunrise glow lamp 8 and sunset glow lamp 9, a fixed star dimming control circuit 20 for fixed star lamps 10 and a planet dimming control circuit 21 for the planet lamps 11. These circuits automatically control the brightnesses of the lamps proportionally or inversely depending on whether the lamp concerned is of the proportion or inverse proportion type, in response to an electric signal from the sensor 16 or 17.

The dawn lamp 6 and twilight lamp 7 are connected to the dimming control circuit 18 by way of a dawn/twilight selecting circuit 22. Likewise the sunrise glow lamp 8 and sunset glow lamp 9 are connected to their dimming control circiut 19 via a sunrise/sunset selecting circuit 23. These dimming control circuits 18, 19 and selecting circuits 22, 23 are connected to a d-c power source 24.

Figure 5:
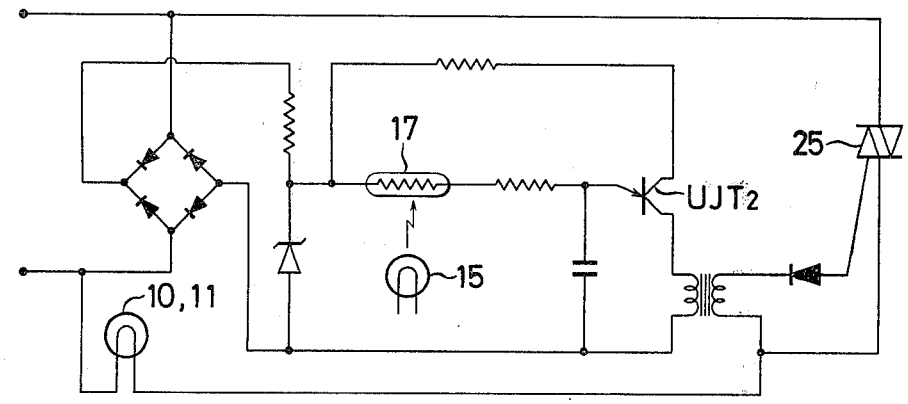
FIG. 5 is a diagram showing a light control circuit for lamps of the inverse proportion type such as light source lamps for projecting fixed stars and planets.

Each of the fixed star dimming control circuit 20 and planet dimming control circuit 21 has a construction as shown in FIG. 5 in which the sensor 17 emits a signal resulting from a change in its resistivity upon detecting a change in the amount of light of the corresponding inverse proportion lamp 15 to control the trigger timing of a bidirectional SCR 25 by way of a unijunction transistor UJT2 and to control the brightness of the light source lamps 10 for the fixed star projector or of the light source lamps 11 for the planet projector in inverse proportion to a change in the brightness of the daylight lamps 5. The timing for the control of the brightness can be determined by the timing with which the sensor 17 is initiated into control operation, which is set by the timing for the unijunction transistor UJT2 to be brought into conduction.

Figure 6:
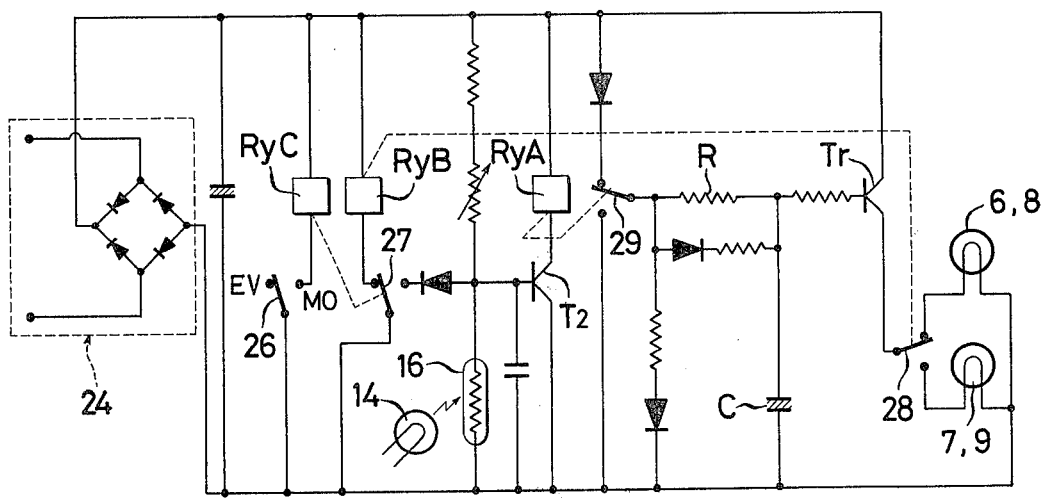
FIG. 6 is a diagram showing a light control circuit for lamps of the proportion type such as lamps for dawn, twilight, sunrise glow and sunset glow.

The combination of the dawn/twilight dimming circuit 18 and the dawn/twilight selecting circuit 22 or of the sunrise/sunset dimming control circuit 19 and sunrise/sunset selecting circuit 23 has a construction as shown in FIG. 6.

FIG. 6 shows a selecting switch 26 as closed at an evening contact EV for representing a sunset scene. When an unillustrated main switch is closed, a relay RYC is held out of operation with its contact member 27 closing a circuit for actuating a relay RYB. Accordingly, the relay RYB is energized to cause its contact member 28 to come into contact with a contact for the twilight lamp 7 or sunset glow lamp 9. In this state, on the other hand, the daylight lamps 5 remain still bright and the sensor 16 for detecting the amount of light of the proportion lamp 14 has a low resistivity. Consequently the base potential of a transistor T2 is low and a relay RYA to be energized by the switching action of the transistor T2 is held out of operation, with its contact member 29 retained in the illustrated position and holding the charging circuit of a capacitor C closed. As a result the elevated voltage charged in the capacitor C maintains the base potential of the transistor Tr at a high level, keeping the twilight lamp 7 or sunset glow lamp 9 bright.

As the daylight lamps 5 are gradually dimmed as already described, the resistivity of the sensor 16 progressively increases to pass current through the energizing circuit for the realy RYA, whereupon the relay contact member 29 thereof is moved to open the charging circuit of the capacitor C, closing its discharging circuit. The capacitor C therefore starts discharging, causing the base potential of the transistor Tr to lower progressively and thereby dimming the twilight lamp 7 or sunset glow lamp 9 gradually. The discharge time is controlled by the capacitor C and resistor R included in the circuit.

If the selecting switch 26 is moved to a morning contact MO for the demonstration of sunrise scene, the relay RYC is energized, whereupon its contact member 27 is moved to open the energizing circuit of the relay RYB. This causes the contact member 28 of the relay to open the contact for the twilight lamp 7 or sunset glow lamp 9 and to close a contact for the dawn lamp 6 or sunrise glow lamp 8. Since the contact memeber 27 of the relay RYC closes the short-circuiting circuit of the sensor 16 simultaneously with opening of the circuit of the relay RYB to render the sensor 16 inoperative, the base potential of the transistor T2 remains at a low level, holding the relay RYA unenergized. Thus the contact member 29 of the relay RYA holds the charging circuit of the capacitor C closed, permitting the base potential of the transistor Tr to elevate gradually and thereby gradually increasing the brightness of the dawn lamp 6 or sunrise glow lamp 8. As already stated, the daylight lamps 5 are gradually brightened.

Figure 7:
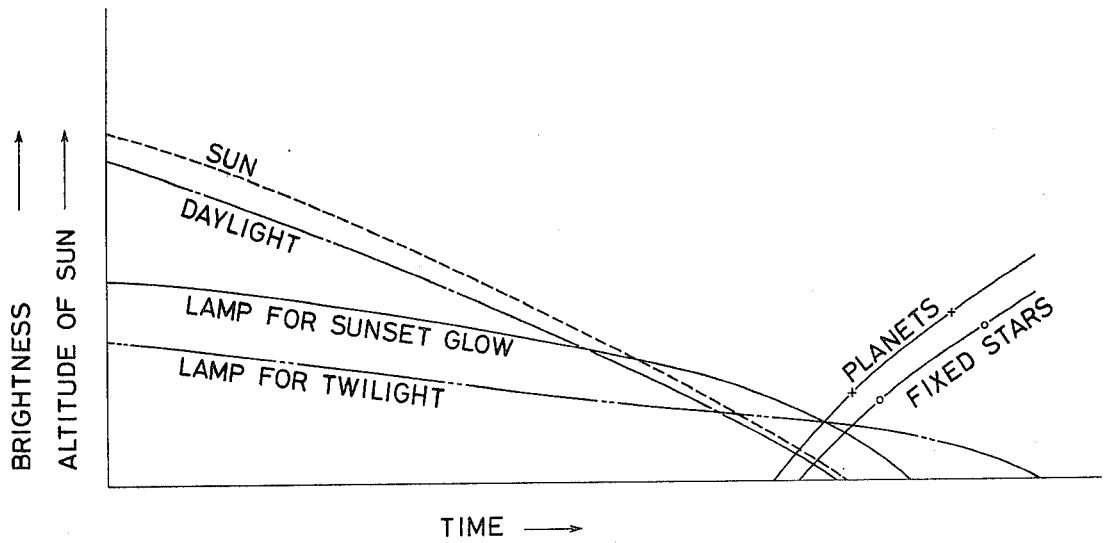
FIG. 7 is a graph showing the relation between time and brightnesses of lamps as controlled for the demonstration of sunset scene.

As described above, the brightnesses of various lamps can be automatically controlled with the controlled timing for the demonstration of sunrise and sunset scenes. It is seen from FIG. 7 showing light control for a sunset scene that the lamps for daylight, sunset glow and twilight are gradually dimmed, whilst the light sources for fixed stars and planets are brightened with changes in the altitude of the sun. In this way light control is achieved full-automatically with the adjusted timing.

The sensor 16 controls the light control timing for the dawn and twilight lamps 6, 7 and sunrise glow and sunset glow lamps 8, 9, and the charge/discharge time determined by the resistor R and capacitor C in FIG. 6 gives dimming control therefor.

Although light control circuits for the sun and moon are not shown, they may be adapted to be controlled by the proportion lamp and inverse proportion lamp as in the foregoing, depending on whether they are of the proportion or inverse proportion type.

The sunrise/sunset selecting switch of the light control circuit may be made automatically operative under the control of a position detector (such as mercury switch) for the projected image of the sun.

What is claimed is:

1. A planetarium apparatus comprising:
daylight lamps for the basic illumination of a dome,
first light control means for automatically varying the brightness of the daylight lamps,
lamps of the proportion type variable in brightness in proportion to a change in the brightness of the daylight lamps;
second light control means for varying the brightnesses of the proportion-type lamps in proportion to a change in the brightness of the daylight lamps and for controlling the timing for varying the brightnesses thereof,
lamps of the inverse proportion type variable in brightness in inverse proportion to a change in the brightness of the daylight lamps, and
third light control means for varying the brightnesses of the inverse proportion-type lamps in inverse proportion to a change in the brightness of the daylight lamps and for controlling the timing for varying the brightnesses thereof.

2. The planetarium as set forth in claim 1 wherein the proportion-type lamps demonstrate sunrise glow, sunset glow, dawn and twilight, and the inverse proportion-type lamps project the images of fixed stars and planets.

3. The planetarium apparatus as set forth in claim 1 wherein the first light control means has a selecting switch for selectively representing a sunrise scene or a sunset scene and comprises an electric circuit including a charge/discharge circuit composed of a capacitor and a resistor and a control circuit connected to the charge/discharge circuit for the phase control of the daylight lamps.

4. The planetarium apparatus as set forth in claim 3 wherein second light control means is connected to the electric circuit of the first light control circuit and has a lamp variable in the amount of light in proportion to a change in the brightness of the daylight lamps and a sensor for converting the brightness of the lamp of the second light control means to an electric signal upon detecting the amount of light thereof so as to control the light of the proportion-type lamps by the electric signal, and the third light control means is connected to the electric circuit of the first light control circuit and has a lamp variable in the amount of light in inverse proportion to a change in the brightness of the daylight lamps and a sensor for converting the brightness of the lamp of the third light control means to an electric signal upon detecting the amount of light thereof so as to control the light of the inverse proportion-type lamps by the electric signal.

5. The planetarium apparatus as set forth in claim 4 wherein the first light control means further has manual light control means and includes a unijunction transistor and a bidirectional SCR in the control circuit.

6. The planetarium apparatus as set forth in claim 4 wherein the second light control means further has a morning/evening selecting switch to be operated selectively for a sunrise or sunset scene and a charge/discharge circuit comprising the combination of a resistor and a capacitor for effecting charging and discharging with a timing controlled by the electric signal from the sensor, whereby the second light control means effects light control with the charging and discharging of the circuit.

7. The planetarium apparatus as set forth in claim 4 wherein the third light control means further has a bidirectional SCR operable under the control of the electric signal by way of a unijunction transistor so as to effect light control in accordance with a change in the resistivity of the SCR.

* * * * *

UNITED STATES PATENT AND TRADEMARK OFFICE
CERTIFICATE OF CORRECTION

PATENT NO. : 3,919,787
DATED : November 18, 1975
INVENTOR(S) : Takeshi Bessho

It is certified that error appears in the above–identified patent and that said Letters Patent are hereby corrected as shown below:

--[30] Dec. 25, 1973   Japan .............. 49-352[U]--

Signed and Sealed this

Seventh Day of March 1978

[SEAL]

Attest:

RUTH C. MASON
Attesting Officer

LUTRELLE F. PARKER
Acting Commissioner of Patents and Trademarks